United States Patent [19]

Höppner et al.

[11] 4,410,151
[45] Oct. 18, 1983

[54] UNMANNED CRAFT

[75] Inventors: Heinz-Jochen Höppner, Bremen; Ulrich Krämer, Syke-Barrien; Hugo Sgarz; Herbert Sadowski, both of Bremen, all of Fed. Rep. of Germany

[73] Assignee: Vereinigte Flugtechnische Werke-Fokker GmbH, Bremen, Fed. Rep. of Germany

[21] Appl. No.: 182,021

[22] Filed: Aug. 28, 1980

[30] Foreign Application Priority Data

Aug. 30, 1979 [DE] Fed. Rep. of Germany ....... 2935044

[51] Int. Cl.³ ............................. B64F 1/04; F41F 3/00
[52] U.S. Cl. ....................................... 244/63; 89/1.801; 89/1.816; 89/1.819; 244/14; 244/3.27; 244/49; 244/120
[58] Field of Search ................... 244/2, 49, 45 R, 120, 244/124, 73–74, 63, 65, 67, 69, 58, 3.1, 3.22–3.23, 3.24–3.28, 14; 102/374–381; 89/1.801–1.819

[56] References Cited

U.S. PATENT DOCUMENTS

| | | | |
|---|---|---|---|
| 2,375,423 | 5/1945 | Lobelle | 244/124 |
| 2,390,677 | 12/1945 | Alkan et al. | 244/14 |
| 2,748,703 | 6/1956 | Goss et al. | 244/63 |
| 2,961,928 | 11/1960 | Rosenthal | 89/1.816 |
| 2,992,794 | 7/1961 | Boyd | 244/14 |
| 3,063,375 | 11/1962 | Hawley et al. | 244/3.27 |
| 3,132,590 | 5/1964 | Hall | 89/1.819 |
| 3,138,352 | 6/1964 | Saholt | 89/1.819 |
| 3,460,430 | 8/1969 | Fisher | 89/1.818 |
| 3,769,876 | 11/1973 | Haas et al. | 89/1.816 |
| 3,988,206 | 11/1976 | Gregory | 244/63 |
| 4,296,894 | 10/1981 | Schnabele et al. | 244/3.1 |

FOREIGN PATENT DOCUMENTS

| | | | |
|---|---|---|---|
| 262917 | of 0000 | Fed. Rep. of Germany | 244/3.27 |
| 1944152 | 3/1971 | Fed. Rep. of Germany | 89/1.816 |
| 1158537 | 6/1958 | France | 102/378 |
| 1436334 | 3/1966 | France | 89/1.816 |
| 756056 | 8/1956 | United Kingdom | 244/63 |

OTHER PUBLICATIONS

Jane's All the World Aircraft, 1977–1978, pp. 643–644, "Canadair CL-89".
Rockwell International. "Forward Swept Wing Technology", 1979.

*Primary Examiner*—Galen L. Barefoot
*Attorney, Agent, or Firm*—Ralf H. Siegemund

[57] ABSTRACT

A vehicle or craft is provided for propeller propulsion with start assist by a releasable rocket engine. The craft is launched from a silo of square-shaped cross-section containing the starter motor for the propeller, whose engine is started while the craft is still in the silo. Diagonally opposed corners of the silo are provided with rails, in which run guides on rudder fins of the craft. The wings are pivoted to the fuselage for deployment whereby the wing tips do not move forward. The rocket engine is jettisoned shortly after take-off by simple disengagement. Parts of the wings and/or the rear of the fuselage may be jettisoned shortly before the craft reaches the target area.

22 Claims, 9 Drawing Figures

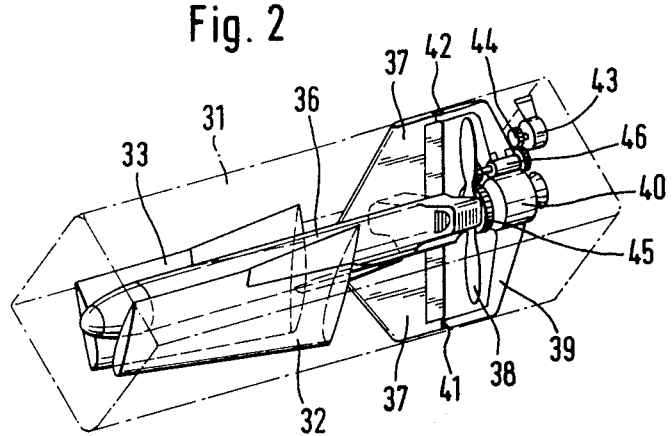
Fig. 2
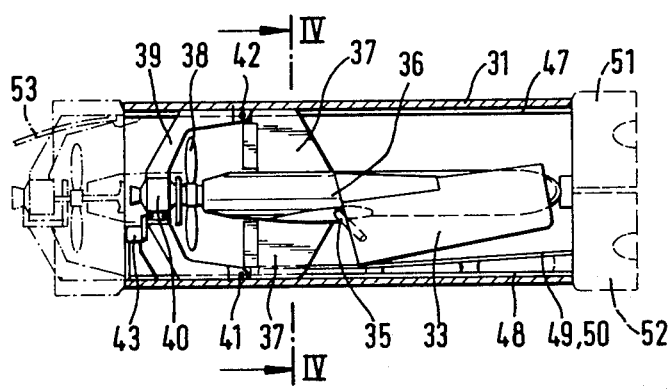
Fig. 3
Fig. 4

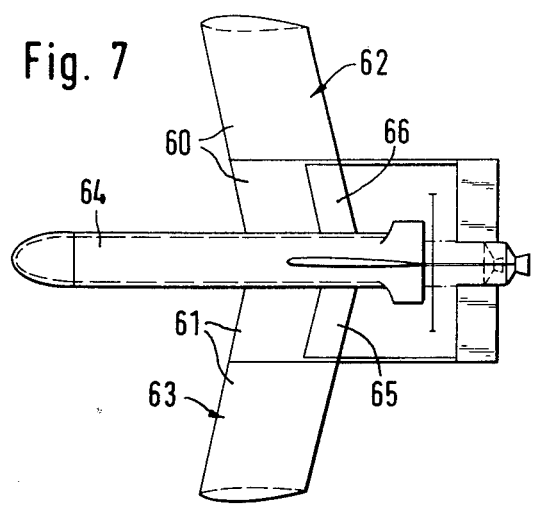
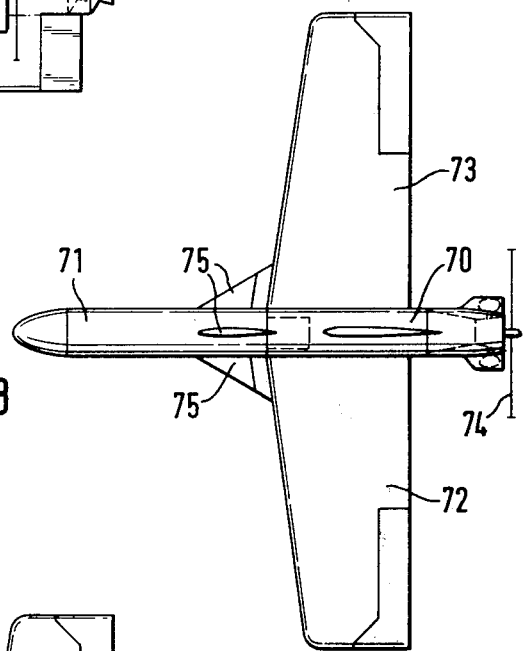
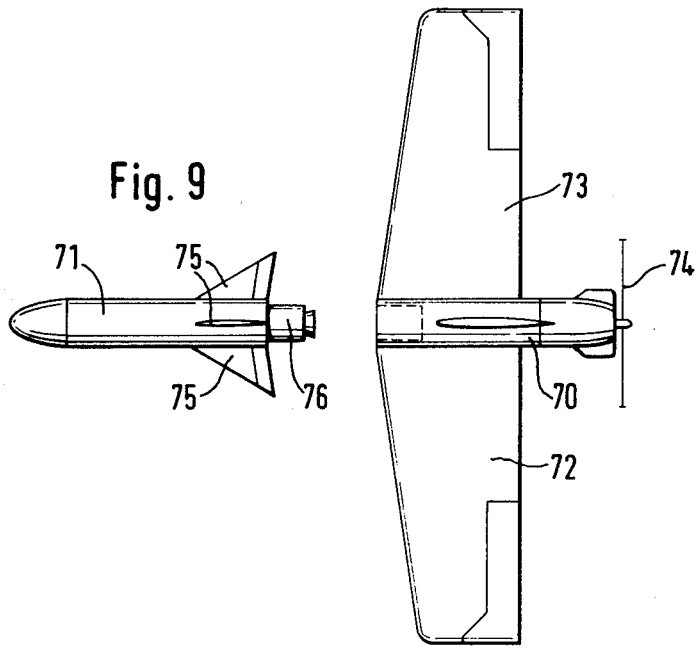

UNMANNED CRAFT

BACKGROUND OF THE INVENTION

The present invention relates to an unmanned aircraft to be launched from a silo, or the like, by means of a rocket engine.

Aircraft of the type to which the invention pertains are launced on rails from a silo, i.e., a suitable container under utilization of a rocket engine. Subsequently, a propeller engine takes over for cruising the vehicle towards a target area. Wings are deployed subsequently to the launch so that the rocket-engine-launched vehicle proceeds by aerodynamic flight.

Aircraft of the type referred to above are sometimes called minidrones, or the like, and are, for example, used as attack vehicles against enemy radar equipment, particularly in air defense installations. These minidrones fly towards enemy territory, search for the installation of interest and attack it, possibly after flying temporarily in a holding mode. These minidrones require comparatively little expenditures, and but a few people are involved in their tactical use. Storage and transport must be simple; because many of them may be needed and are to be held in readiness for strategical reasons. The same is true in regard to maintenance and the launching procedure. Also, these crafts should occupy little space, as they should be kept in an unobtrusive manner.

An aircraft of the type outlined above is described, for example, in Aviation Week And Space Technology, Volume 109, Nov. 23, 1978, particularly pages 42 and 43. Propulsion of that craft is the result of rocket launching and subsequent aerodynamic flight. Wings, control foils, and propellers are all retracted during launching to be deployed only after departure from the launching silo. The wings, in particular, are normally folded back and are folded forward for deployment. Alternatively, the wings are rigid but pivotal about a center axis. Normally, they are folded in a position on the fuselage. After take-off, they are deployed by pivoting by 90 degrees.

Following launching of such a vehicle from a silo, a critical phase occurs during the transition from rocket propulsion to propeller-driven cruising. Since this phase occurs rather early, it may endanger personnel at the launch site if launching was not successful. Also, the craft may be lost. This transition phase may, for example, be unsuccessful when any of the retracted parts, which are needed for aerodynamic flight, are not or only insufficiently deployed. Also, the propeller and its drive may not start properly.

DESCRIPTION OF THE INVENTION

It is an object of the present invention to provide a new and improved rocket-engine-launched aircraft and launching facility for such a craft which avoids the problems outlined above concerning the transition from rocket propulsion to cruising flight. The craft and its launch facility should be of simple construction, inexpensive and easy to maintain.

It is another object of the present invention to provide a new and improved propeller drift craft with rocket engine launch assist.

It is a further object of the present invention to improve launch facilities for unmanned aircraft.

In accordance with the preferred embodiment of the present invention, a combination is suggested, in which a storage container and launching silo is constructed to have rail means, preferably rails which run in and along opposite corners of the container or silo, being of rectangular (e.g., square-shaped) cross section. This silo contains a vehicle which has a fuselage, folded-away wings or wing portions, an engine-driven propeller in the rear which can freely rotate inside the silo, and laterally extending guide means to run in the rail means. A rocket engine is releasably connected to the vehicle, using preferably the means supporting the (or actually being the) guide means of the craft in the silo, for obtaining this connection. Moreover, the means supporting the guide means are preferably part of the rudder fin construction for the craft.

The propeller engine is started in the silo, prior to rocket ignition, and the starting motor is preferably a part of the silo equipment. Thus, the propeller engine of the craft is started prior to launch; upon ignition of the rocket engine the connection to the starter motor is broken, the vehicle is launched. Since the vehicle runs in two, azimuthally spaced rails, its initial travel path is very accurately determined. Spacing the rails by a large angle, preferably 180 degrees, makes optimum use of the silo space which is important as to the requirement that the propeller be permitted to rotate inside the silo. If the rails are in the corners of a rectangle (square), they cannot possibly interfer with propeller rotation. Guiding the vehicle on and in diagonally oppositely guide tracks and rails optimizes suppression of unwanted spin. This is particularly important as torque is exerted upon the craft and the silo rails when the propeller runs.

It can thus be seen that the inventive features permit a construction in which the propeller does not have to be deployed subsequently but can rotate already in the silo so that the vehicle will be launched only when the propeller does, in fact, rotate prior to launch. The transition from rocket start to propeller flight is, thus, no longer critical; it occurs automatically when the rocket engine is exhausted and produces no longer a thrust that exceeds the propeller thrust. The rocket engine may now simply separate from the vehicle which continues under propeller engine power.

As stated, the rudder structure is preferably combined with the guide structure for the vehicle as to its movement inside the silo. Thus, the rudder does not have to be deployed subsequently either. The only structure elements to be deployed after a successful launch are the wings. These wings are deployed either by sideways folding about longitudinal axes, running parallel to the main longitudinal axis of the craft, or by a combined backward-sideways folding and deployment of wings that are folded forward on the fuselage as long as the craft is in the silo. The invention positively avoids the folding of the wings or of portions thereof in forward direction for deployment. Deployment is, thus, independent from or aided by the forward acceleration of the craft on take-off. Having to work against that acceleration may well produce failure during a launch.

In furtherance of the invention, it is suggested to construct either the wings, or the fuselage, or both so that portions thereof can be jettisoned when the vehicle approaches the target area. This permits higher speed in the critical attack phase and reduces the possibility of external interference (being a target, wind, and so forth).

It should also be noted that the craft is provided with a crosswing-like wing plus rudder fin combination which facilitates maneuvering. The rocket engine may be connected to that construction by means of stabilizer-type airfoils defining a matching cross in alignment therewith. Also a separate rudder structure is not needed, the rudder fins serve a triple function: (a) rudder; (b) support for the guide means running on the silo rails; and (c) mounting structure for the rocket engine.

In the case of biparted, foldable wings, the elevators are preferably on the wing stubs which are fixed to the fuselage. Thus, the craft is immediately controllable by these elevators when emerging from the silo.

The preferred embodiment of the invention, the objects and features of the invention, and further objects, features and advantages thereof, will be better understood from the following description taken in connection with the accompanying drawings.

DESCRIPTION OF THE DRAWINGS

FIG. 2 is a second example, also shown in perspective view;

FIG. 3 is a longitudinal section view through the craft depicted in FIG. 2;

FIG. 4 is a section view as indicated by lines IV—IV in FIG. 3;

FIG. 7 is a top elevation of the craft modified from the construction shown in FIG. 1; and FIGS. 8 and 9 are top elevations of a craft, possibly as per any of the preceding figures but showing a modification as it is effective in two stages.

Proceeding now to the detailed description of the drawings, several of the figures show a container or silo 1 of square-shaped cross section and having a frontal opening 2 for take-off and launching of the vehicle or craft it contains. This opening is normally closed by a cover (not shown). The container stores the vehicle and serves also as launching ramp. As shown further, this particular silo is part of a plurality of containers arranged in a grid or matrix-like pattern, all being parallel and extending towards the same direction.

Figure 1:
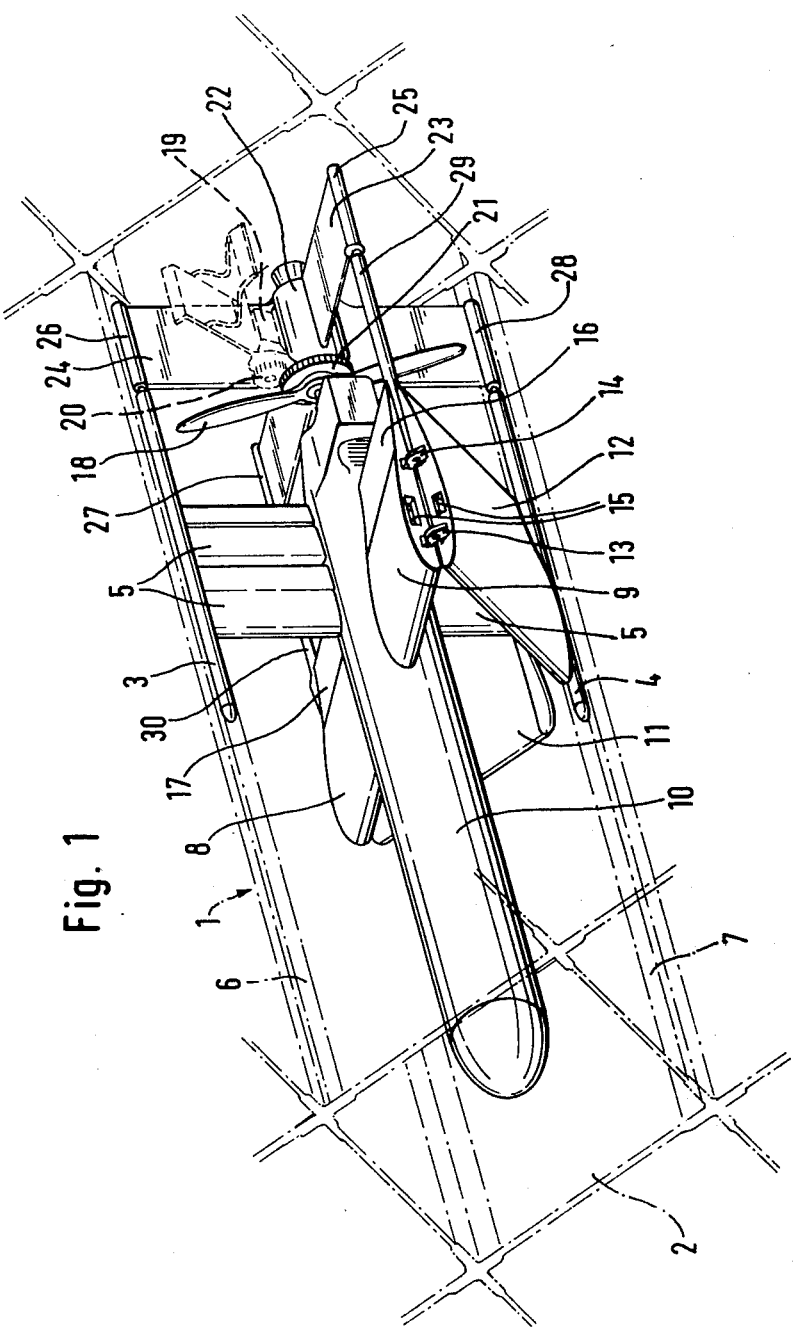
FIG. 1 is a perspective view of a craft in accordance with the preferred embodiment of the present invention constituting one example for practicing the best mode thereof.

The unmanned craft contained in the silo of FIG. 1 includes a body or fuselage 10 which is positioned concentrically to the center axis of the silo. The position is maintained by means of longitudinal guide elements 3 and 4 respectively affixed to the two rudder fins 5 which extend from the fuselage in opposite directions. Broadly speaking, the guide tubes 3 and 4 are positioned and mounted azimuthally apart from each other, the optimum being 180°, as depicted. It is structurally significant that the support of the grid tubes, 3 and 4, and these guide elements themselves are integrated in the rudder construction. This feature saves weight and aids in overall balancing.

Two opposite corners of this silo 1 are provided with rail means 6 and 7; the guide elements 3 and 4 run, respectively, in these rails. The rails may simple be constructed as angle profiles or sections. It can readily be seen that this arrangement of the rails optimizes also the guiding of the vehicle in the silo and holds it against rotation. The rail means 6 and 7 each may be comprised of sections which have been slid apart.

The wings of the craft are each biparted in about the middle of their respective span, or a little closer to the fuselage. Thus, wing portions or stubs 8 and 9 are secured to the fuselage 10. Outwardly extending (during flight) airfoil and wing portions or extensions 11 and 12 are, respectively, hinged to the wing portions 8 and 9; the hinges being denoted by numerals 13 and 14, they are spring-biased in the sense that the springs tend to move the wing extensions into a deployed position. The hinges are provided so that the wing extensions 11 and 12 are pivotal on axes which run parallel to the longitudinal axis of the craft.

Elevators 16 and 17 for the craft are affixed to the rigid wing portions 8 and 9, respectively. Thus, the elevators are not a part of the deployable portions of the wings; they are operational in the desired orientation right from the start. Payload and control electronics for operating the elevators and rudders are contained in the fuselage. Also contained in body 10 is an engine which may be a regular piston engine driving a propeller 18. The propeller 18 has dimensions to fit into the silo 1, at least in some positions. Particularly, the propeller 18 is smaller than the spacing between opposite sides of the silo. Thus, propeller 18 can freely rotate in the silo. One can also say that the span of the propeller and the diameter of the circle described by the propeller tips are smaller than the diagonal spacing of the rails and of the guide elements 3 and 4, divided by the square root of two.

A starter motor 19 is mounted to the end of silo 1, inside thereof but opposite opening 2. Motor 19 drives a pinion 20 which meshes a gear ring 21 on the propeller axis, as long as the vehicle is in the silo. Thus, elements 20 and 21 establish not only driven train gearing but a coupling between silo and craft; i.e., between starter motor and piston engine. As the craft moves, the gears simply disengage axially. The engine is started while the craft is still in its storage container. Motor 19 is disposed excentrical to the center axis of the silo.

Reference numeral 22 refers to a rocket engine for accelerating the craft in the launching phase. This rocket engine is mounted to the craft aft of the propeller 18 but coaxial therewith. The rocket engine can, however, be released. The construction, thus, permits separation of the rocket engine from the remainder of the craft, which entails great savings in weight and fuel. Also, this construction favors modular design aspects which facilitates assembly. Particularly the rocket engine can readily be exhanged and/or mounted to the craft when already in the silo. The rocket engine is releasably connected to the craft in the following manner.

The connecting means for the rocket engine is comprised in this example of cross-wise arranged stabilizing surfaces 23 and 24, which are arranged at right angles on the rocket engine. The two foils 23 are coplanar with the wings, the two foils 24 are coplanar with the rudders 5. This arrangement minimizes the effect of a shift of the center of gravity when later the rocket engine is jettisoned.

The foils 23 and 24 are provided with tubular projections 25, 26, 27, and 28. Projections 26 and 28 bear against the rear ends of guide elements 3 and 4, while projections 25 and 27 bear against projections 29 and 30, respectively extending rearwards from the outer ends of fixed wing portions 8 and 9. The rear ends of projections 29 and 30 are of semispherical configuration and contour, and they project into matching semispherical recesses in the elements 26 and 28. There may be no further connection between the rocket engine and the craft. It is significant, however, that the stabilizer surfaces 23 and 24 are in line with the cross-wise arrangement of wing stubs 8 and 9 and of the rudder 5. The cross-wise arrangement of these latter elements establishes actually a cross-wing structure which does not require a still further structure for elevators.

The folding back or under of the wing extensions as depicted makes optimum use of silo space. The same is true for the cross-wise arrangement of wing stubs, rudders, and stabilizer foils in the diagonals of the square-shaped silo interior.

The vehicle is launced as follows. Motor 19 starts the piston engine of the vehicle via gearing 20 and 21. Further operation depends on a successful engine start. This engine transmits thrust upon the vehicle via the stabilizer foils 23 and 24 and the coupler elements 25 to 28. Thus, the vehicle is pushed out of the silo by thrust received via the elements 3, 4, and 29, 30. The vehicle is accelerated thereby and leaves the silo. Elements 3 and 4 guide the vehicle in the rails 6 and 7 for as long as they engage them. The arrangement of rails and guide elements are such that the craft is also held against any torque on account of the rotating propeller. In view of the diametrically opposed disposition of the guide structure, the torque load on the silo structure is minimized.

Neither the propeller, nor the rudder, nor the elevators require further deployment. Thus, the aerodynamic control surfaces of the craft are fully available for control as soon as the craft is launched. However, as soon as the vehicle has left the silo spring-biased hinges 13 and 14 cause the wing extensions 11 and 12 to, respectively, align with the wing stubs 8 and 9 whereupon latches 15 lock the now deployed wing in position. The motion required for deployment by the wing extensions and by their tips in particular does not have a forward component. Thus, the concurrently ensuing acceleration is not effective as a retarding force upon the wing deployment. The hinge mechanism for the wing extension is, thus, not additionally loaded. Moving wings forward would entail significant forces and could lead to failure.

During take-off, the rocket engine 22 pushes the craft in four points of engagement; the connection between the rocket engine and the remainder of the craft is retained only by this transfer of force. As soon as the rocket engine 22 stops combustion, or, more precisely, combustion drops to such an extent that the developed thrust falls below the thrust level produced by the propeller, the vehicle will just separate itself from the rocket engine 22 and the latter drops off. The vehicle continues, but now as a propeller-driven aircraft.

Another version of the inventive craft and launch system is depicted in FIGS. 2, 3, and 4. The storage and launch container or silo 31 may well be identical with silo 1 in FIG. 1 or is at least quite similar therewith. Similarity includes at least the dimensional considerations, and the provision of guide rails, denoted here 47 and 48. Similarity includes also the starter motor, here 43, and a pinion drive 44.

The vehicle shown in FIGS. 2 to 4 is somewhat different. Its wings, 32 and 33, have the so-called S-shaped mean line profile. These wings are respectively pivotable on axes which extend obliquely to the main axes of the craft, at 45° from the longitudinal axis as well as in down direction. The axes are also declined by 45° to a horizontal axis extending transversely to the longitudinal axis and in the axis of the deployed wings. These pivot axes are defined here by the axes of bolts or pins 34 and 35 which are rotatably mounted to and extend from the fuselage 36. The pins 34 and 35 are, on the other hand, secured to and firmly anchored in the wings.

Reference numeral 37 refers to two rudders being integrated with longitudinal end-reinforcements 37a which run in rail means 47 and 48 of the silo. The front portions of the rails 48 include cams 49, arranged to both sides of that rail and provided for engagement of the downwardly extending leading edges of the wings. This engagement determines the onset of wing deployment.

A piston-engine-driven propeller 38 is provided in the aft portion of the fuselage. A fork-like holder 39 of areal construction reaches along and over the propeller and holds the rocket engine, 40. Holder 39 can also be construed as a rearward extension of the rudders 37 bearing against the guide portions at the outer end of the rudder. Holder 39 is connected to these guide portions by means of shear pins 41 and 42.

In addition to the starter motor 43 and pinion 44, gear 45 is an input gear to a gear 46 being also mounted to the rocket engine holder 39, but being provided to start the piston engine.

The front end of silo or container 31 is closable by means of flaps 51 and 52, the rear end is closable by a flap 53. This latter flap is provided for ease of access to the rear portion of the craft; for example, for maintenance, or the like. The craft is disposed as far to the rear end of the silo as possible. This permits also access to the portion of the fuselage containing the payload.

Figures 5, 6:
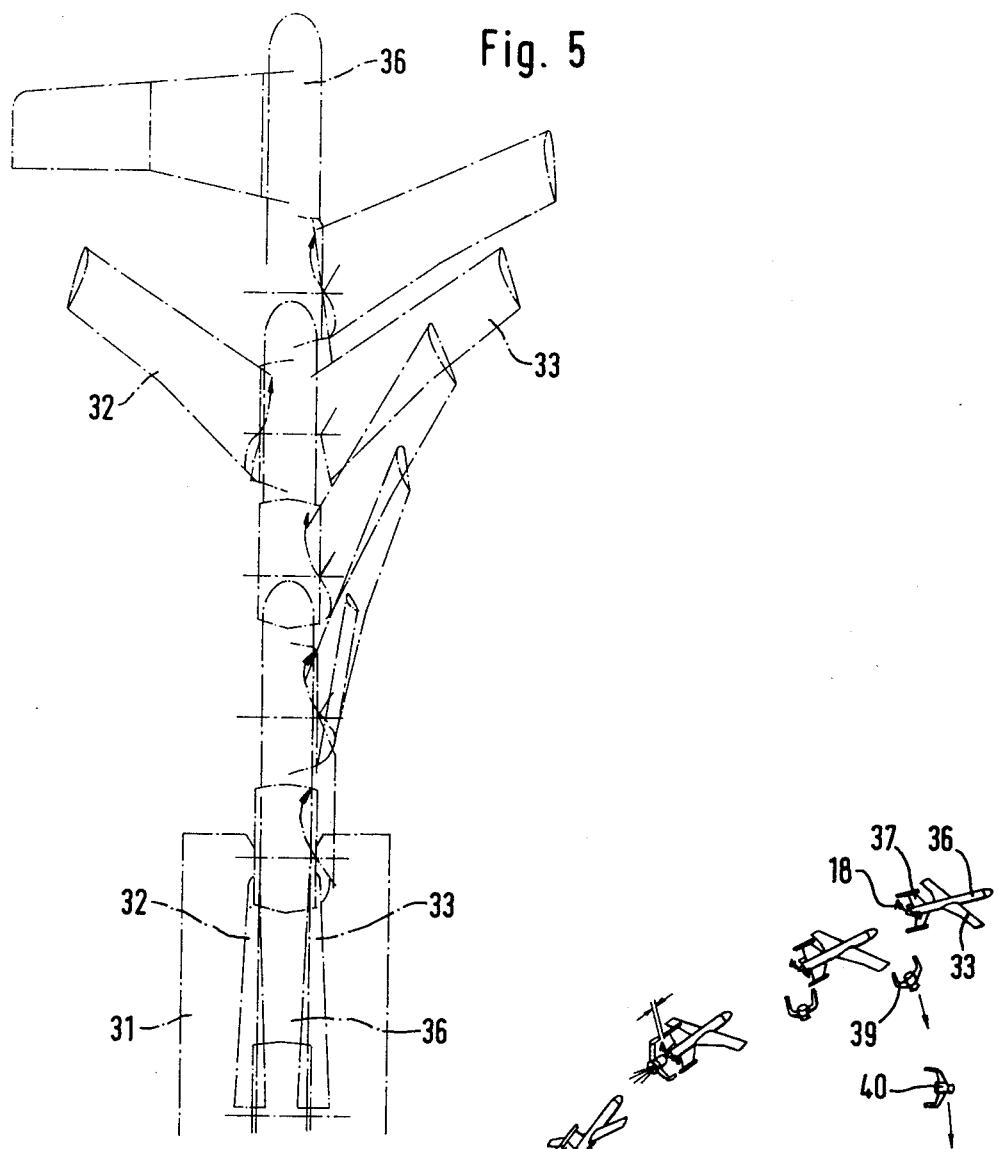
FIG. 5 illustrates schematically and in steps the deployment of wings of the craft shown in FIGS. 2, 3 and 4.
FIG. 6 is a pictorial representation of the launching of the craft of FIGS. 2 to 5.

FIGS. 5 and 6 depict the launch of such a vehicle. FIG. 6 illustrates in particular a truck 55 whose load portion and compartment 54 is constructed to establish a multitude of twenty-four silos or launch containers. The truck is provided with lateral thrust support legs to avoid tipping during a launch. The several crafts can be launched one after the other.

Starting is carried out as described; that is to say, the respective starter motor in the particular silo starts the piston engine which is followed by igniting the rocket engine while the propeller runs already. As the rocket engine causes lift-off, the connection between stationary equipment and craft are separated.

At first, the craft slides in rails 47 and 48, while the guide cams 49 initiate the deployment of the wings. The deployment continues as a result of inertia and air resistance. The wings pivot about the respective axes of the pins 34 and 35 and, in effect, fold sideways and backwardly from the initially forward disposition. After a turn by 90°, the wings are fully deployed, the wing tips having performed a full quarter turn while each wing turning on its longitudinal, wing span axis (upper portion of FIG. 5). It can readily be seen from FIG. 5, showing several steps of deployment in upward direction on the drawing, the wing tips move back in relation to the fuselage. Thus, deployment is directly aided by the acceleration of the craft in the launch phase.

Following the launch, thrust development of the rocket engine will decline causing an increase in tension on shear pins 41 and 42. Soon, the drag on the rocket engine and on the holder will cause the pins to shear, holder 39 is released and the rocket engine 40 will be jettisoned. The craft is now propelled exclusively by its piston-engine-driven propeller.

FIGS. 7, 8, and 9 illustrate certain variations which do not, however, constitute departures from the basic principles involved. The specific feature shown in FIG. 7 can actually be realized in either of the versions of FIGS. 1 and 2. The wings are provided with outer extensions 62. Whether or not these extensions are hinged as shown in FIG. 1 is immaterial presently. Decisive is that these extensions can be separated completely from the residual wing portions. The dividing line of extension and fuselage-near portion can, however, be drawn differently from any hinge-folding requirement for prelaunch storage as per FIG. 1. Decisive here is that the outer wing portions 62 are larger in proportion. These portions are released for separation and drop off just prior to the craft reaching its target. The remaining wing portions carry the elevators 65 and 66 so that the craft remains maneuverable. This is particularly true as the craft is of a true cross-wing-like construction in which residual wing stubs and rudder form the wing cross. The craft is increasingly maneuverable by this configuration which is important for the final stage when the craft is to follow an exactly controlled path towards the target. It should be noted that all control surfaces, rudders, and elevators are retained close to the fuselage. Moreover, the craft with parts of its wings jettisoned is less susceptible of flight path deviations on account of wind gushes, and so forth.

The wings, however, show another modification; they are swept forward to some extent. This feature avoids undue displacement of the neutral point of the craft following the separation of the outer wing portions. This particular wing contour has no direct bearing on the initial deployment.

The craft shown in FIGS. 8 and 9 may well be of the type explained above with reference to FIGS. 1 and 2; also, its wings could be modified as per FIG. 7. The specific feature illustrated here relates to the construction of the fuselage. The fuselage has a front portion 71 and a rear portion 70 connected thereto but being separable therefrom.

The wings 72 and 73 as well as the rudders, and the propeller engine with propeller 74 are mounted on the rear fuselage 70; the payload is in the front portion 71. The front portion 71, however, is provided with separate control fins 75 arranged in a cross-pattern. Moreover, the front portion 71 has its own rocket engine 76 which is not used for launching.

This particular craft is launched as described. Just prior to reaching the target, the front portion 71 separates from the rear portion by means of explosive connections, or the like. Next, rocket engine 76 fires and this part with payload, possibly under control of target-seeking devices, homes in on the target (FIG. 9). The residual craft is easily maneuverable at high speeds and is less sensitive against wind. The separate rear portion may be constructed for continued flight and may be remote-controlled to return to the launch site or another point in friendly territory, to be reused. Alternatively, it may just crash.

The invention is not limited to the embodiments described above; but all changes and modifications thereof, not constituting departures from the spirit and scope of the invention, are intended to be included.

We claim:

1. A combination, comprising:
   a launch silo of rectangular cross section having an open or openable front and rail means along two oppositely located corners;
   a vehicle in the silo having a fuselage and means for extending laterally from the fuselage for supporting guide means to run on said rail means;
   propeller-driven engine means on the vehicle and having a propeller which can freely rotate when the vehicle is in the silo, said laterally extending means, extending well beyond a circle delineated by the propeller when rotating;
   rocket engine means releasably connected to the vehicle to be disposed aft of the propeller means to impart launching thrust upon the vehicle; and
   wing means, deployably attached to the fuselage and prior to launch being retracted towards the fuselage into a position in which the respective wing tips are not more rearward in relation to the fuselage than in a deployed position, said wing means being capable of deployment as soon as the vehicle has left the silo.

2. The combination as in claim 1, the silo including a starter motor and releasable drive-connecting means, the vehicle including means for connection to the releasable drive-connecting means so that the propeller drive engine can be started while the vehicle is in the silo, the drive-connecting means disengaging from the means for connection following launching the vehicle through ignition of the rocket engine means.

3. The combination as in claim 1, the silo having an openable rear wall.

4. The combination as in claim 1, the silo including cam means to initiate wing deployment.

5. The combination as in claim 1, the means for supporting being a pair of rudder support fins.

6. The combination as in claim 1, the wings having portions attached to the fuselage, the deployable portions being hinged to the attached portions about axes running parallel to a longitudinal center axis of the fuselage, the attached wing portions extending, respectively, towards remaining corners of the silo.

7. An unmanned craft provided for rocket engine and propeller-type of propulsion, and to be launched from a silo, comprising:
   an enlongated fuselage;
   a pair of wings, each having a first portion affixed to the fuselage and having a second, outer deployable portion for being folded forward against the fuselage for deployment following launching from a silo and by means of pivoting about axes running parallel to a longitudinal axis of the fuselage;
   a propeller engine driving a propeller;
   rocket engine means releasably connected to the fuselage, aft of the propeller; and
   guide means for guiding the vehicle upon being launched from the silo, the guide means extending from the fuselage in radial directions, from different azimuthal locations of the fuselage, and at distances therefrom to extend beyond a circle as described by the propeller when rotating.

8. An unmanned aircraft to be launched from a silo having two parallel running, diametrically opposed rails, comprising:
   a fuselage;
   a pair of fins with rudders extending oppositely from the fuselage and having guide means for running in the rail means;

wing means, deployably attached to the fuselage and prior to launch being retracted towards the fuselage into a position in which the respective wing tips are not more rearward in relation to the fuselage than in a deployed position;

the fuselage containing an engine, there being a propeller for being driven by the engine, the propeller having dimensions to inscribe a circle upon rotation whose diameter multiplied by the square root of two is less than a total extension of the fins; and rocket engine means releasably connected to the fuselage aft of the propeller.

9. A craft as in claim 7 or 8, the guide means being constructed to have rearward portions to which the rocket engine means are releasably connected to be thereby connected to the fuselage.

10. An unmanned aircraft as in claim 7 and having rudder means constructed as two fin means extending oppositely from the fuselage, the wings and the fins establishing a cross-configuration.

11. An unmanned aircraft as in claim 10 or 8 the fin means being integrated with and supporting the guide means on the fuselage.

12. A craft or vehice as in claim 1, or 8, the wings each having a first portion affixed to the fuselage, and a second, outer deployable portion pivotable respectively on parallel axes running parallel to a longitudinal axis of the fuselage.

13. A craft or vehicle as in claim 12, the first portions of the wings having rearward extensions also being releasably connected to the rocket engine means.

14. A craft or vehicle as in claim 13, the rocket engine means being connected to the fuselage in a cross-pattern-like configuration, of which the first portions of the wings form a first bar, and rudder means for the craft or vehicle form a second transverse bar.

15. A craft or vehicle as in claim 1 or 8, the wings being pivoted on the fuselage about axes extending oblique to a longitudinal axis of the fuselage out of a plane defined by the said longitudinal axis and a transverse axis through the wings when fully deployed.

16. A craft or vehicle as in claim 15, said pivot axes being at 45° angle to the longitudinal axes and 45° to said transverse axis.

17. A craft or vehicle as in claim 1, 7, or 8, the wings each being biparted, a respective outer portion of each wing being releasably connected to a respective inner portion for being jettisoned.

18. A craft or vehicle as in claim 17, the wings being of sweep-forward configuration.

19. A craft or vehicle as in claim 1, 7, or 8, the fuselage being biparted, the wings being connected to a rearward portion of the fuselage, the rearward portion of the fuselage being provided with aerodynamic guide means.

20. A craft or vehicle as in claim 19, a forward portion of the fuselage being provided with further aerodynamic guide means, the latter guide means being independent from any aerodynamic guide means on the rearward portion of the fuselage.

21. A craft or vehicle as in claim 19, the forward portion of the fuselage including second rocket engine means.

22. A unmanned craft provided for rocket engine and propeller-type of propulsion and to launched from a silo, comprising:

an elongated fuselage;

a pair of wings being pivoted on the fuselage about axes extending oblique to a longitudinal axis of the fuselage and out of a plane defined by the said longitudinal axis and a transverse axis through the wings when fully deployed;

a propeller engine driving a propeller;

rocket engine means releasably connect to the fuselage, aft of the propeller; and guide means for guiding the vehicle along said longitudinal axis upon being launched, the guide means extending from the fuselage in radial directions, from different azimuthal locations of the fuselage, and at distances therefrom to extend beyond a circle as described by the propeller when rotating.

* * * * *